United States Patent
Horitani et al.

(10) Patent No.: US 10,323,977 B2
(45) Date of Patent: Jun. 18, 2019

(54) SUPPORT STRUCTURE FOR A COMBINATION WEIGHING DEVICE

(71) Applicant: Ishida Co., Ltd., Kyoto (JP)

(72) Inventors: Yoshiki Horitani, Ritto (JP); Hideshi Miyamoto, Ritto (JP); Toshiharu Kageyama, Ritto (JP); Yutaka Tamai, Ritto (JP); Mikio Kishikawa, Ritto (JP); Naomi Imaaki, Ritto (JP); Go Kobayashi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 15/511,763

(22) PCT Filed: Sep. 18, 2015

(86) PCT No.: PCT/JP2015/076776
§ 371 (c)(1),
(2) Date: Mar. 16, 2017

(87) PCT Pub. No.: WO2016/043325
PCT Pub. Date: Mar. 24, 2016

(65) Prior Publication Data
US 2017/0299423 A1    Oct. 19, 2017

(30) Foreign Application Priority Data

Sep. 19, 2014  (JP) .................................. 2014-191870
Oct. 31, 2014  (JP) .................................. 2014-223338
Oct. 31, 2014  (JP) .................................. 2014-223342

(51) Int. Cl.
    *G01G 19/393*      (2006.01)

(52) U.S. Cl.
    CPC .................................. *G01G 19/393* (2013.01)

(58) Field of Classification Search
    CPC .................................................. G01G 19/393
    (Continued)

(56) References Cited

U.S. PATENT DOCUMENTS 4,497,385 A * 2/1985 Sashiki ................. G01G 13/00
                                                177/244
4,819,749 A * 4/1989 Guardiola ............ G01G 19/393
                                                177/25.18
4,840,240 A * 6/1989 Toyoda ................ G01G 13/242
                                                177/1

(Continued)

FOREIGN PATENT DOCUMENTS

CN          102530465 A      7/2012
EP             1197734 A1    4/2002
(Continued)

OTHER PUBLICATIONS

International Search Report issued in PCT/JP2015/076776; dated Dec. 22, 2015.
(Continued)

*Primary Examiner* — Natalie Huls
*Assistant Examiner* — Monica S Young
(74) *Attorney, Agent, or Firm* — Studebaker & Brackett PC

(57) ABSTRACT

A combination weighing apparatus having excellent sanitation includes: a plurality of weighing mechanisms, a weighing mechanism frame which stores the weighing mechanisms, and a body frame which supports the weighing mechanism frame, in which a normal to a surface of the body frame is inclined with respect to a vertical direction.

14 Claims, 17 Drawing Sheets

(58) Field of Classification Search
USPC .......................................................... 177/58
See application file for complete search history.

(56) References Cited

U.S. PATENT DOCUMENTS

| | | | |
|---|---|---|---|
| 6,188,029 B1 * | 2/2001 | Miyamoto | G01G 19/393 |
| | | | 177/105 |
| 6,753,484 B1 | 6/2004 | Widmer | |
| 2002/0157874 A1 | 10/2002 | Wako et al. | |
| 2010/0288565 A1 * | 11/2010 | Wineland | G01G 11/00 |
| | | | 177/145 |

FOREIGN PATENT DOCUMENTS

| | | |
|---|---|---|
| JP | H06-38316 A | 2/1994 |
| JP | H10-019647 A | 1/1998 |
| JP | 2001-255199 A | 9/2001 |
| JP | 2003-128015 A | 5/2003 |
| JP | 2008-066445 A | 3/2008 |
| JP | 2012-136332 A | 7/2012 |
| JP | 2014-085165 A | 5/2014 |
| WO | 00/66983 A1 | 11/2000 |
| WO | 01/088491 A1 | 11/2001 |

OTHER PUBLICATIONS

Notification of Transmittal of Translation of the International Preliminary Report on Patentability and Translation of Written Opinion of the International Searching Authority; PCT/JP2015/076776 dated Mar. 30, 2017.

\* cited by examiner

SUPPORT STRUCTURE FOR A COMBINATION WEIGHING DEVICE

TECHNICAL FIELD

The present invention relates to a combination weighing apparatus.

BACKGROUND ART

As a combination weighing apparatus in the related art, for example, a combination weighing apparatus described in Patent Literature 1 is known. The combination weighing apparatus described in Patent Literature 1 includes: a dispersion supply portion which disperses and supplies a weighing object to the surroundings; a plurality of hoppers which are circumferentially arranged around the dispersion supply portion, each weigh a predetermined amount of the weighing object so as to be selectively dropped and discharged; and a collection chute which is disposed below the hoppers and collects and discharges the discharged weighing object. The dispersion supply portion, the plurality of hoppers, and the collection chute are attached to a body portion, and the body portion is supported by a cylindrical support column.

CITATION LIST

Patent Literature

Patent Literature 1: Japanese Unexamined Patent Publication No. 2001-255199

SUMMARY OF INVENTION

Technical Problem

In the combination weighing apparatus, an article for which sanitation has to be considered, such as food, is a weighing object in many cases, and cleaning of the apparatus is performed at the installation place of the apparatus. During the cleaning, when cleaning water is accumulated, sanitation is degraded. Therefore, in the combination weighing apparatus, a structure in which cleaning water or the like is not accumulated in the apparatus is desired.

An object of the present invention is to provide a combination weighing apparatus having excellent sanitation.

Solution to Problem

A combination weighing apparatus according to an aspect of the present invention includes: a plurality of weighing mechanisms; a weighing mechanism frame which stores the weighing mechanisms; and a body frame which supports the weighing mechanism frame, in which a normal to a surface of the body frame is inclined with respect to a vertical direction.

In the combination weighing apparatus, the normal to the surface of the body frame is inclined with respect to a vertical direction. Accordingly, since the surface of the body frame is inclined, cleaning water or the like adhered to the surface easily falls. Therefore, the accumulation of the cleaning water or the like on the surface of the body frame can be prevented. As a result, the combination weighing apparatus has excellent sanitation.

In an embodiment, the body frame may be constituted by flat surfaces, and a normal to an upper surface and/or a lower surface of the body frame may be inclined with respect to the vertical direction. Accordingly, since the upper surface and/or the lower surface of the body frame is inclined, the cleaning water or the like adhered to the upper surface and/or the lower surface easily falls, and thus the cleaning water or the like is not accumulated on the upper surface and/or the lower surface. Therefore, the combination weighing apparatus has excellent sanitation.

In the embodiment, the normal to the upper surface and/or the lower surface of the body frame is inclined toward an outside or an inside of the body frame with respect to the vertical direction. For example, in a case where the normal to the upper surface is inclined toward the outside of the body frame with respect to the vertical direction and the normal to the lower surface is inclined toward the inside of the body frame with respect to the vertical direction, the upper surface and the lower surface of the body frame are inclined downward from the inside toward the outside of the body frame. Therefore, the cleaning water or the like adhered to the body frame is guided to the outside of the combination weighing apparatus. Therefore, the cleaning water or the like can be prevented from falling immediately below the combination weighing apparatus, and thus a combination weighing apparatus having excellent sanitation can be realized.

In the embodiment, the body frame has a greater dimension in an up and down direction than a dimension in a horizontal direction. When the dimension in the up and down direction is set to be greater than the dimension in the horizontal direction, the rigidity of the body frame in the up and down direction is increased. Therefore, disturbance such as floor vibration and vibration due to the apparatus itself can be effectively suppressed. As a result, the influence of disturbance and the like on the weighing mechanism can be suppressed, and an improvement in the weighing accuracy of the weighing mechanism can be achieved.

In the embodiment, the body frame may have a horizontal extension member that extends horizontally, and a normal to an upper surface and/or a lower surface in a vertical section of the horizontal extension member may be inclined with respect to the vertical direction. Accordingly, since the upper surface and/or the lower surface in the vertical section of the horizontal extension member is inclined, the cleaning water or the like adhered to the upper surface and/or the lower surface easily falls, and thus the cleaning water or the like is not accumulated on the upper surface and/or the lower surface. Therefore, the combination weighing apparatus has excellent sanitation.

In the embodiment, the normal to the upper surface and/or the lower surface of the horizontal extension member may be inclined toward the outside or the inside of the body frame with respect to the vertical direction. For example, in a case where the normal to the upper surface is inclined toward the outside of the body frame with respect to the vertical direction and the normal to the lower surface is inclined toward the inside of the body frame with respect to the vertical direction, the upper surface and the lower surface of the horizontal extension member are inclined downward from the inside toward the outside of the body frame. Therefore, the cleaning water or the like adhered to the horizontal extension member is guided to the outside of the combination weighing apparatus. Therefore, the cleaning water or the like can be prevented from falling immediately below the combination weighing apparatus, and thus a combination weighing apparatus having excellent sanitation can be realized.

In the embodiment, the vertical section of the horizontal extension member may have a quadrangular shape that is elongated in the up and down direction. Since the horizontal extension member has a quadrangular shape that is elongated in the up and down direction, compared to a case where a cylindrical shape having the same area is used, high rigidity can be easily secured in the up and down direction. Therefore, it is easy to prevent vibration in the up and down direction which easily affects the measurement error of the combination weighing mechanism and to keep the measurement performance of the combination weighing mechanism high.

In the embodiment, a support frame which supports a component group that is provided so as to be detachable from the apparatus may be included, and the support frame may be disposed substantially horizontally and an upper surface thereof is curved. Accordingly, the cleaning water or the like is not accumulated on the surface of the support frame. Therefore, excellent sanitation is achieved.

In the embodiment, an entire surface of the support frame may be curved. Since the entire surface of the support frame which supports the detachably provided component group is curved, when components are attached to or detached from the support frame, even in a case where an operator grasps the support frame or contacts the support frame, safety can be secured.

In the embodiment, a section of the support frame may have a true circle shape. Accordingly, safety can be further enhanced and manufacturing can be easily performed.

In the embodiment, the body frame may have a support column disposed in the up and down direction, and a weighing machine support frame which is disposed between the weighing mechanism frame and the support column to support the weighing mechanism frame, and at a joint portion between the weighing mechanism frame and the weighing machine support frame, an angle between a lower surface of the weighing mechanism frame and a lower surface of the weighing machine support frame is an obtuse angle. Accordingly, articles, the cleaning water, or the like can be prevented from being accumulated on the joint portion between the lower surface of the weighing mechanism frame and the lower surface of the weighing machine support frame, and thus excellent sanitation is achieved.

In the embodiment, a plate-like rib which extends to a lower portion of the weighing machine support frame and has a smaller dimension in the horizontal direction than that of the weighing machine support frame may be included, and an inclination angle of a lower surface of the rib may be greater than an inclination angle of the lower surface of the weighing machine support frame. By providing the rib, the rigidity of the weighing machine support frame can be further enhanced. As a result, disturbance such as floor vibration and vibration due to the apparatus itself can be further suppressed, and it becomes possible to further enhance the weighing accuracy. Furthermore, the rib has a plate shape having a smaller dimension in the horizontal direction than that of the weighing machine support frame, and the inclination angle of the lower surface of the rib is set to be greater than the inclination angle of the lower surface of the weighing machine support frame. Accordingly, the cleaning water or the like is easily concentrated on the lower surface of the rib, and the cleaning water or the like flows along the lower surface of the rib and is discharged. Therefore, the accumulation of the cleaning water or the like on the lower surface of the rib can be prevented, and as a result, sanitation is further improved.

In the embodiment, a discharge path member which discharges articles weighed by the weighing mechanisms after combination weighing to a lower side may be included, the body frame may have the support column extending vertically, and a normal to an upper surface of the support column may be inclined toward an outside of the discharge path member with respect to the vertical direction. Since the upper surface of the support column of the body frame is inclined downward in a direction away from a discharge port of the discharge path member, it is easy to prevent the cleaning water or the like adhered to the upper surface of the support column from falling in a direction toward the discharge port, and a combination weighing apparatus having excellent sanitation can be realized.

Advantageous Effects of Invention

According to the present invention, excellent sanitation is achieved.

DESCRIPTION OF EMBODIMENTS

Figure 1:
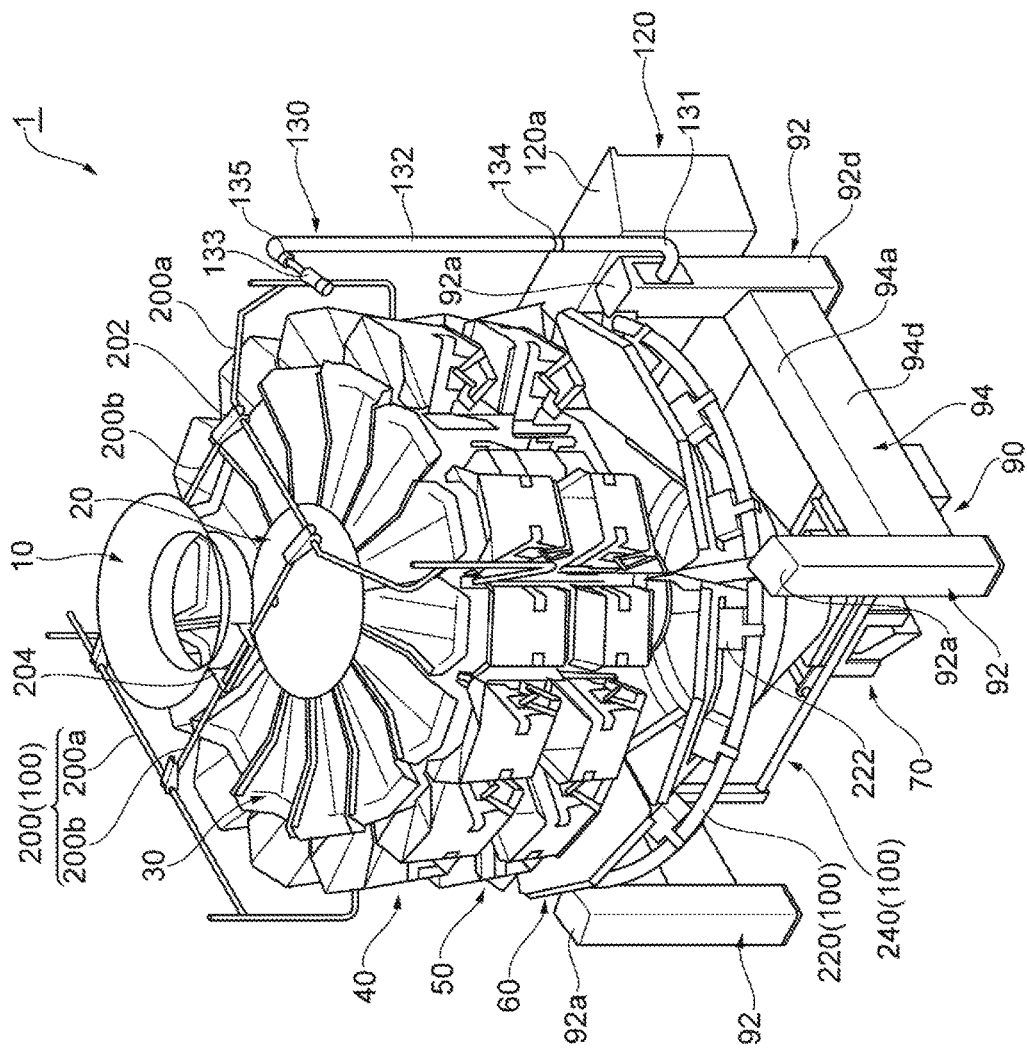
FIG. 1 is a perspective view of a combination weighing apparatus according to an embodiment.

Hereinafter, preferred embodiments of the present invention will be described in detail with reference to the accompanying drawings. In the description of the drawings, like elements which are the same or similar to each other are denoted by like reference numerals, and redundant description will be omitted.

(1) Overall Configuration

Figure 2:
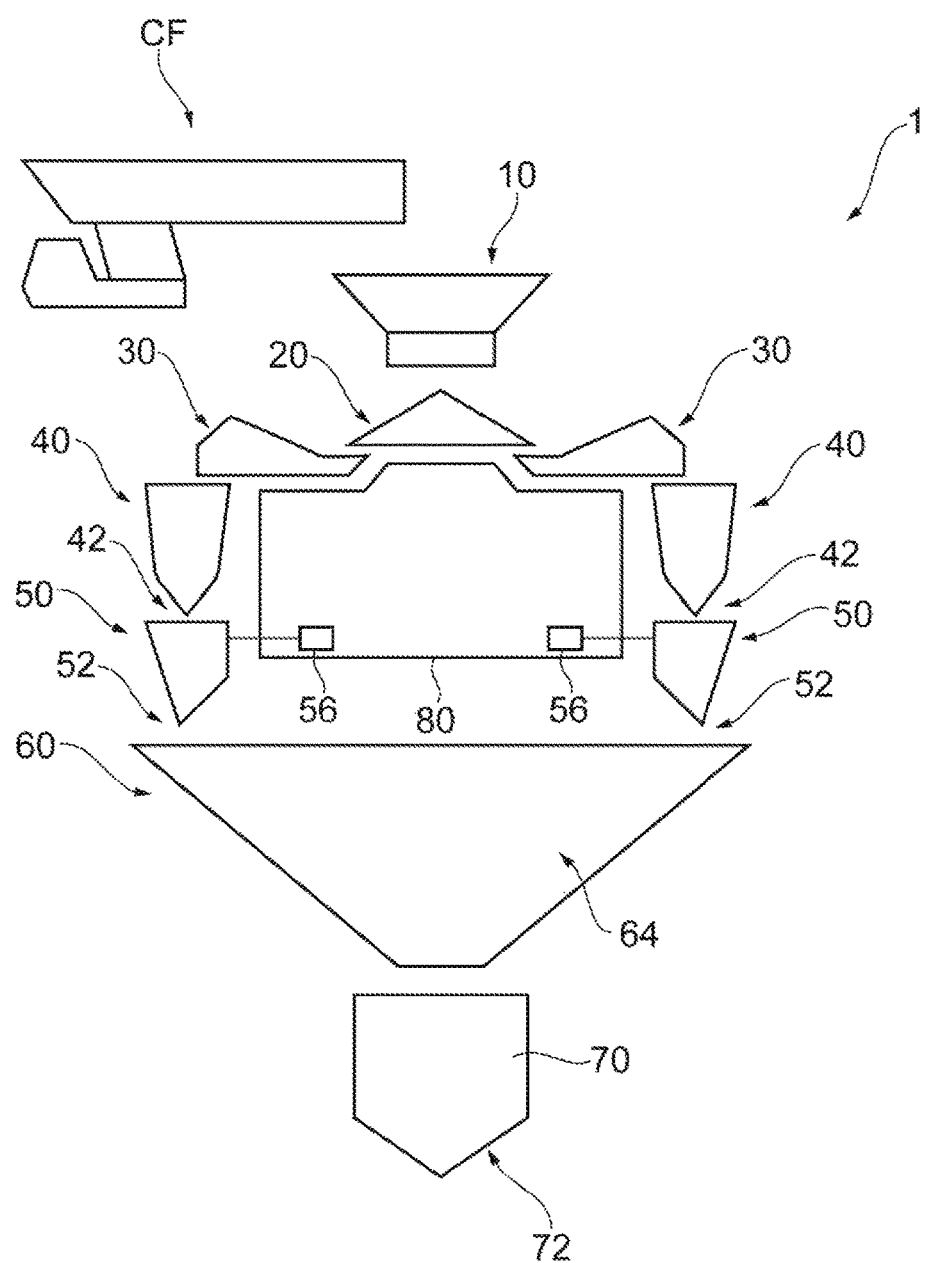
FIG. 2 is a view schematically illustrating the configuration of the combination weighing apparatus.
Figure 3:
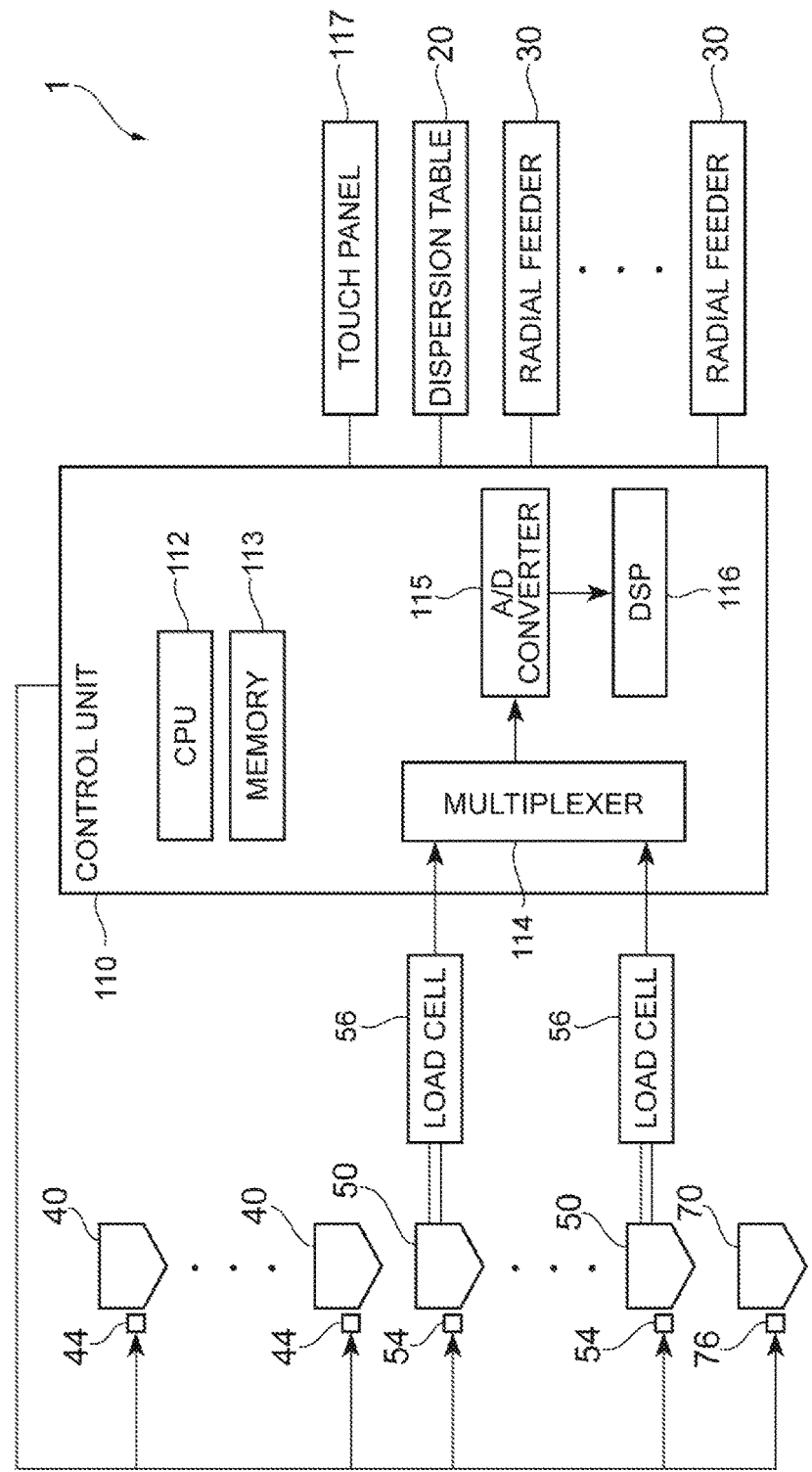
FIG. 3 is a block configuration diagram of the combination weighing apparatus.
Figure 4:
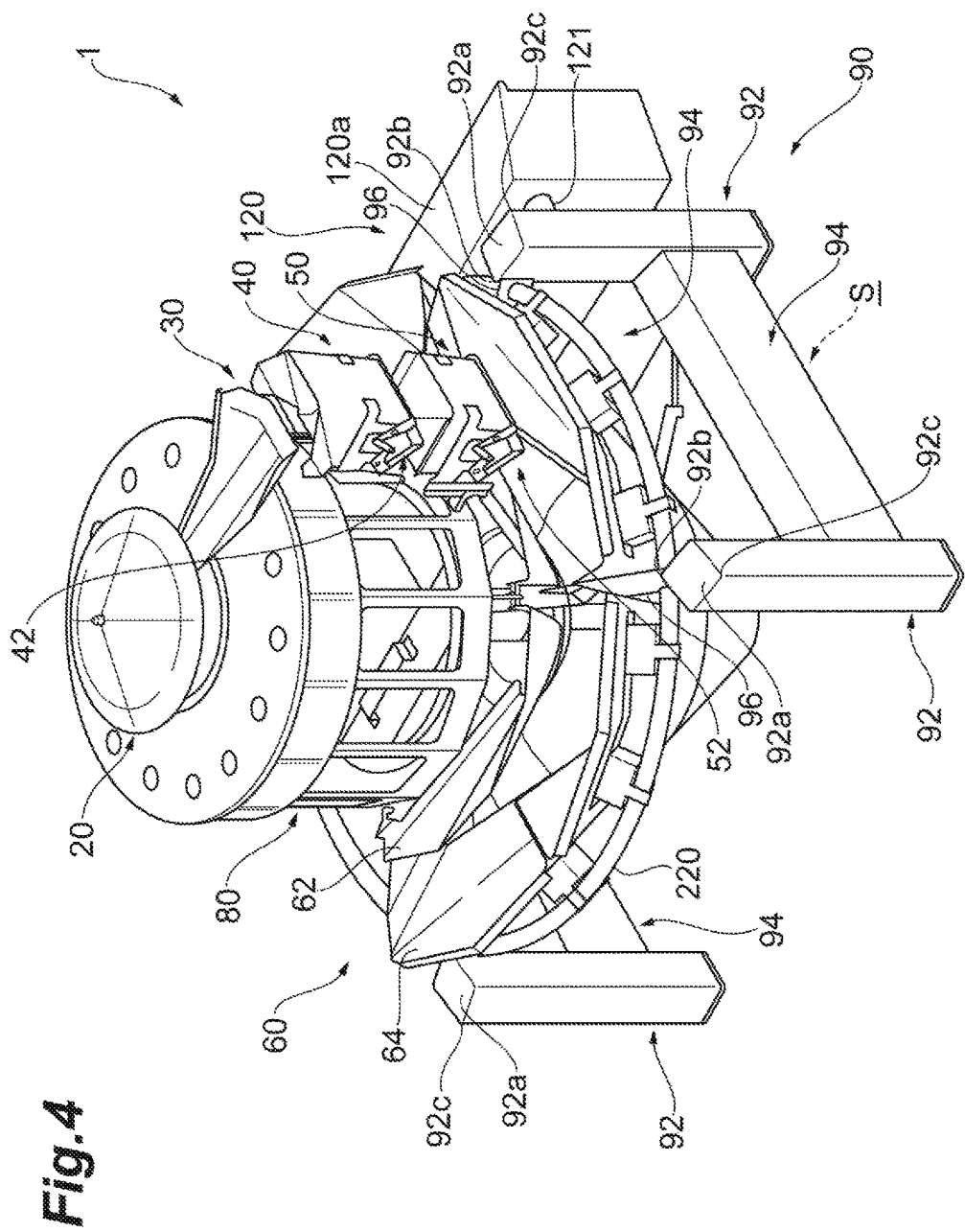
FIG. 4 is a perspective view illustrating a state in which some components are removed from the combination weighing apparatus illustrated in FIG. 1.
Figure 5:
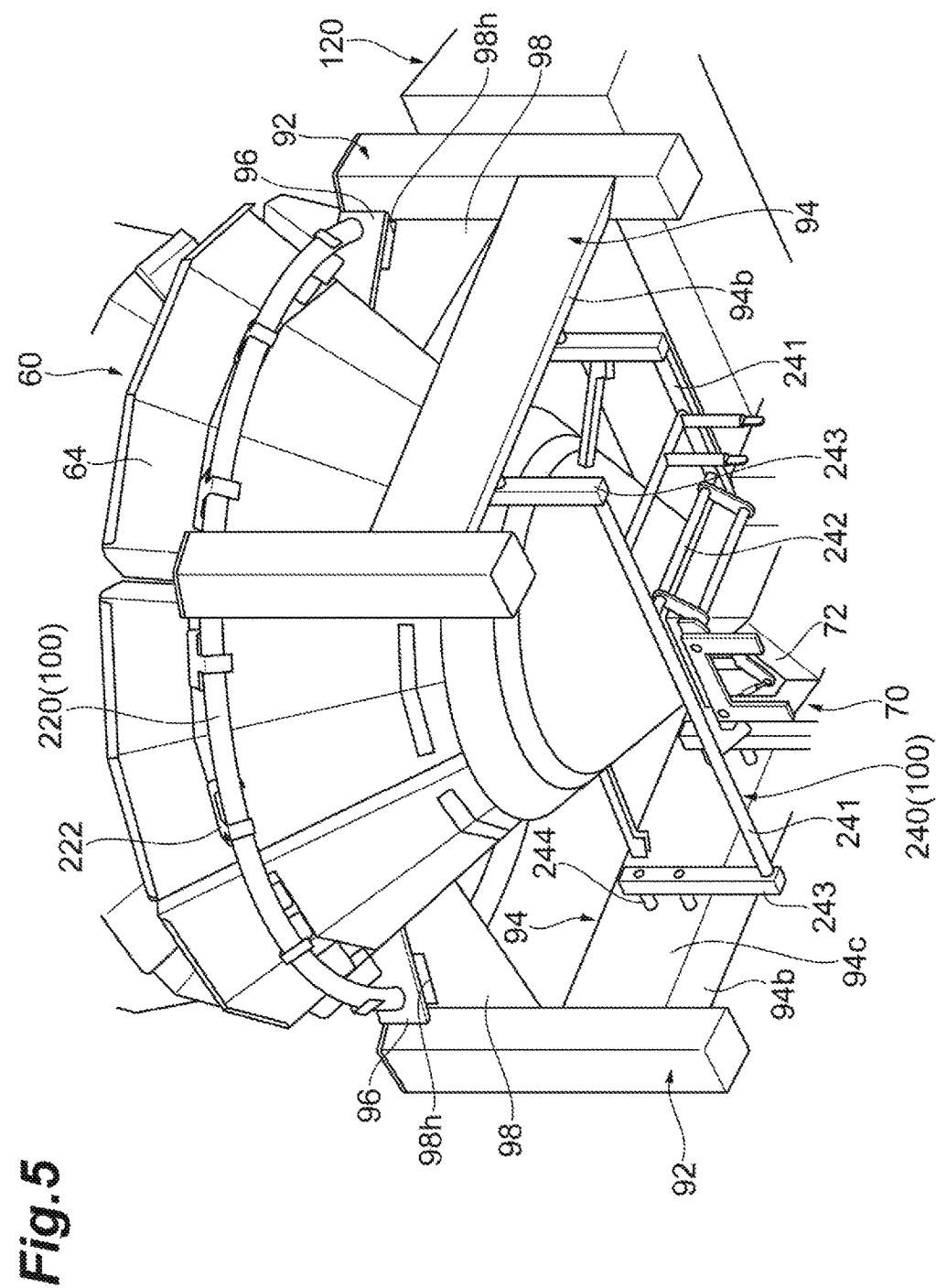
FIG. 5 is a perspective view of the combination weighing apparatus viewed from below.
Figure 6:
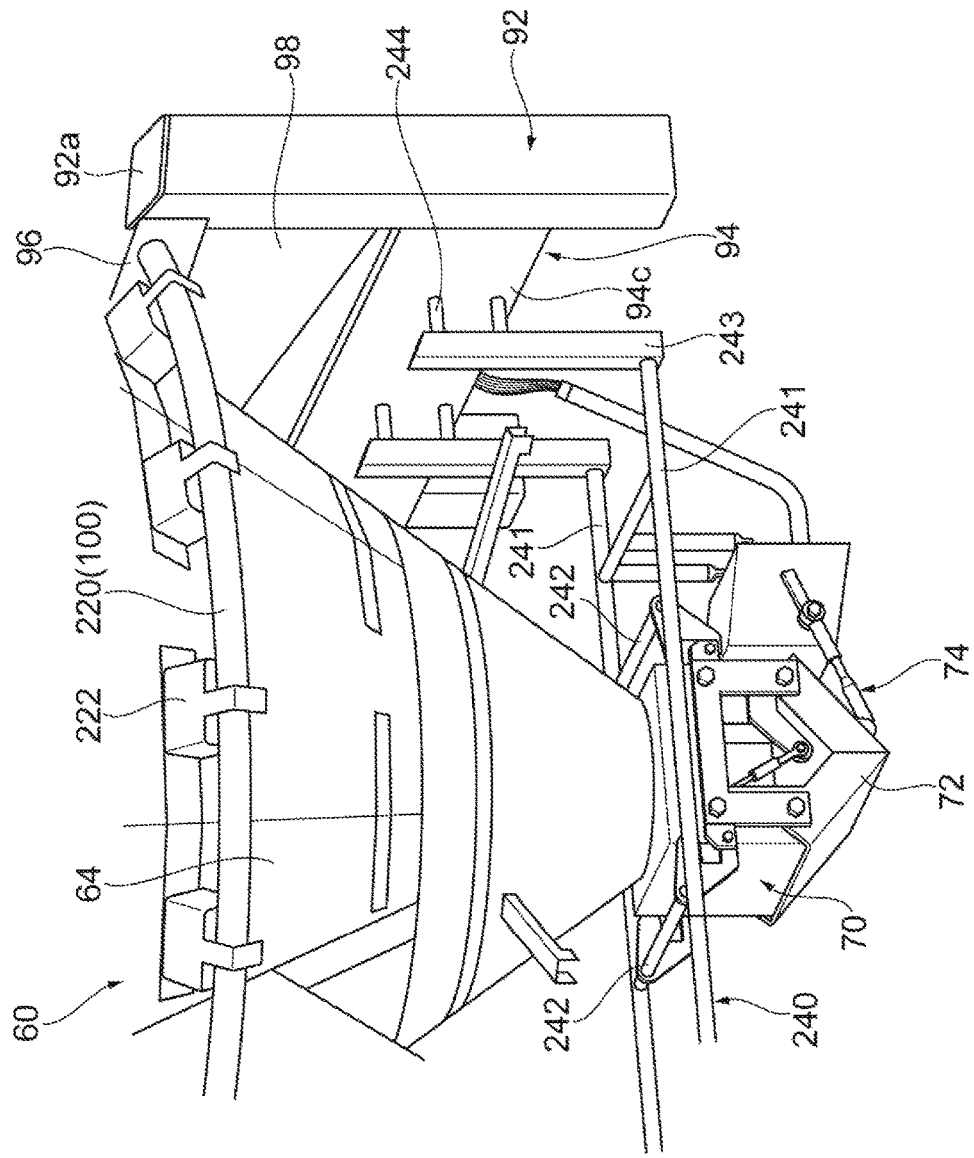
FIG. 6 is a perspective view illustrating the lower section of the combination weighing apparatus.
Figure 7:
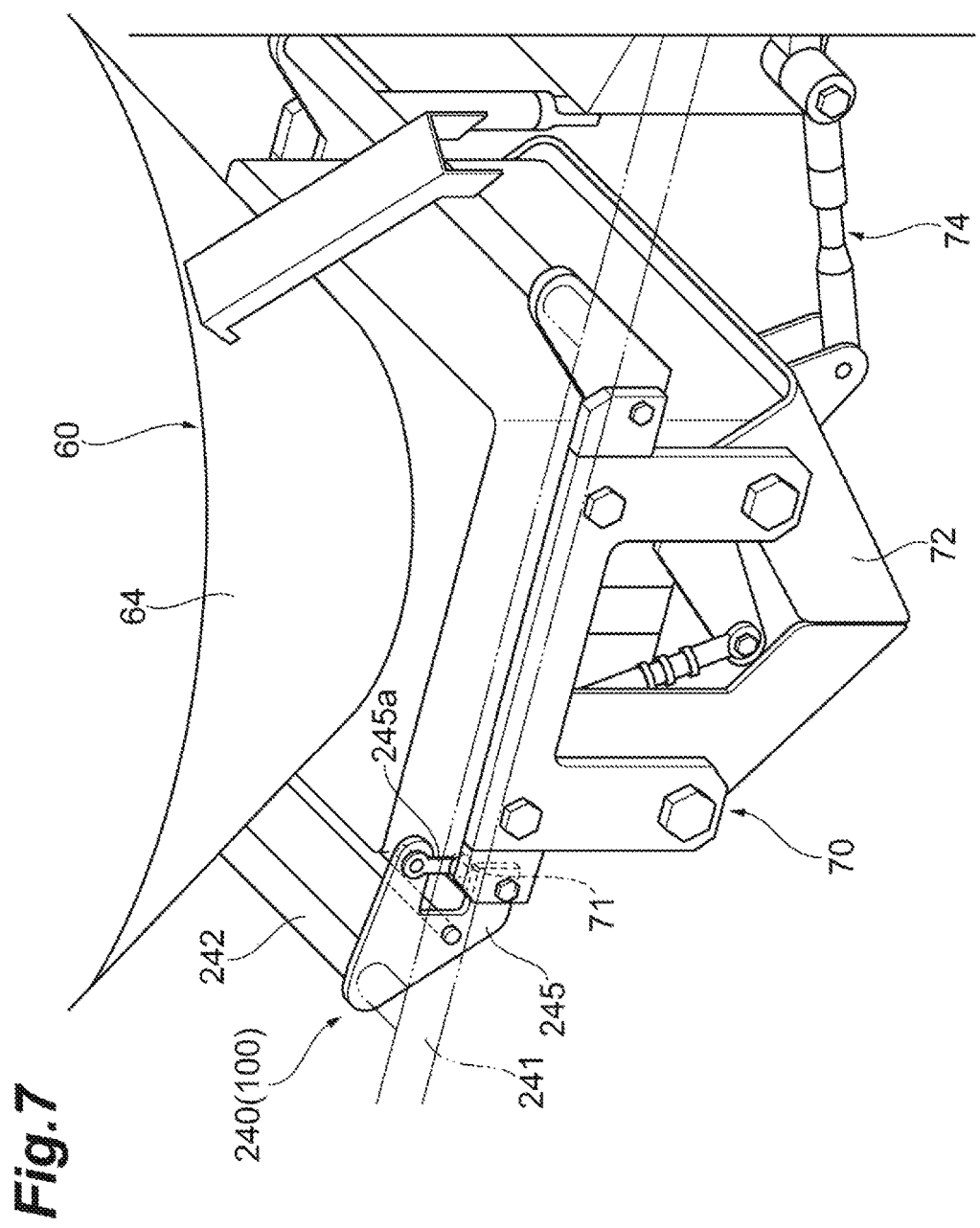
FIG. 7 is a perspective view illustrating a configuration in the vicinity of a timing hopper.
Figure 8:
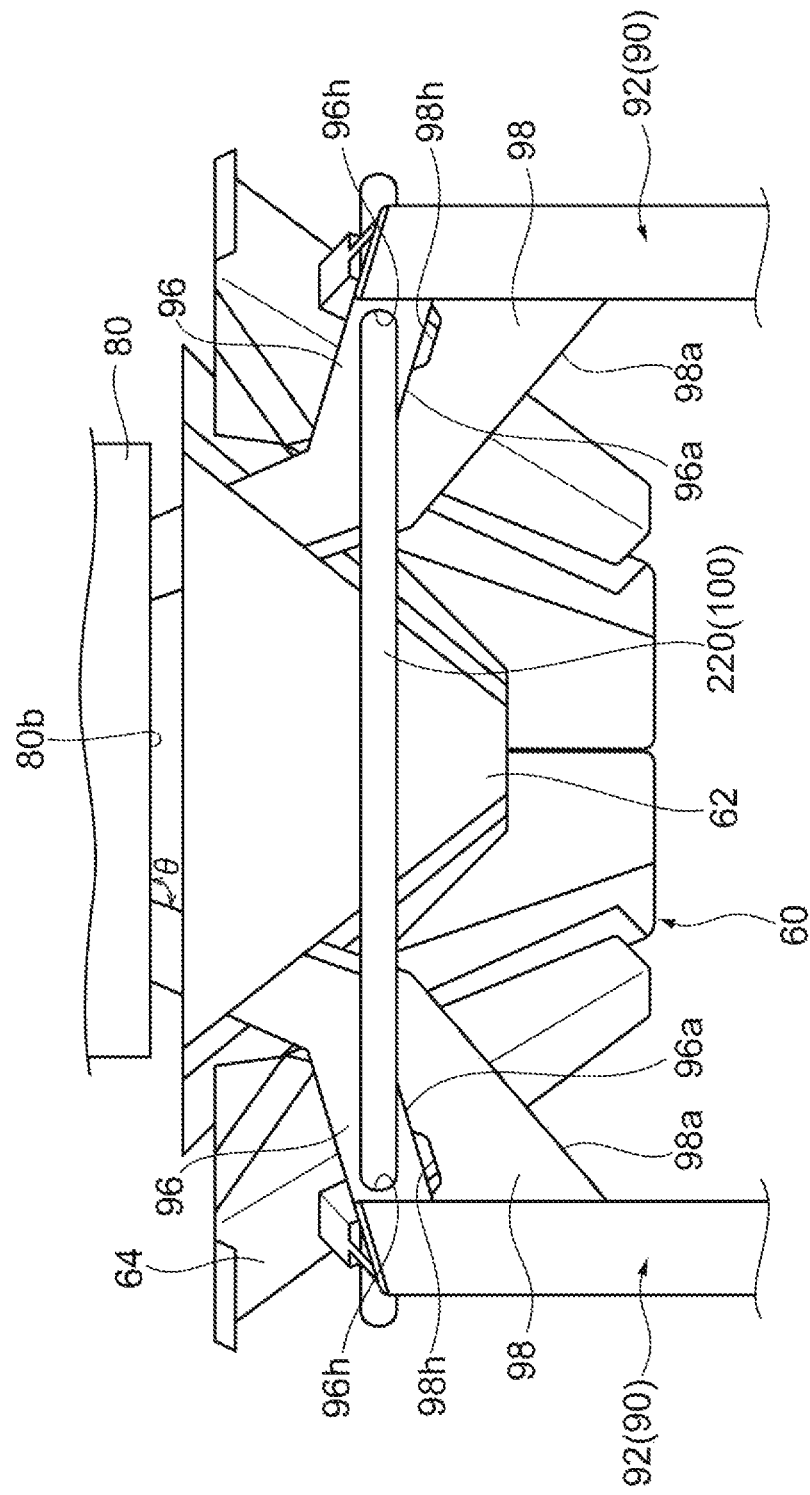
FIG. 8 is a front view illustrating the configuration of the lower section of the combination weighing apparatus.

FIG. 1 is a perspective view of a combination weighing apparatus according to an embodiment. FIG. 2 is a view schematically illustrating the configuration of the combination weighing apparatus. FIG. 3 is a block configuration diagram of the combination weighing apparatus. FIG. 4 is a perspective view illustrating a state in which some components are removed from the combination weighing apparatus illustrated in FIG. 1. FIG. 5 is a perspective view of the combination weighing apparatus viewed from below. FIG. 6 is a perspective view illustrating the lower section of the combination weighing apparatus. FIG. 7 is a perspective view illustrating a configuration in the vicinity of a timing hopper. FIG. 8 is a front view illustrating the configuration of the lower section of the combination weighing apparatus.

The combination weighing apparatus 1 includes an article supply chute 10, a dispersion table 20, a plurality of radial feeders 30, a plurality of pool hoppers 40, a plurality of weighing hoppers 50, a collection discharge chute section 60, a timing hopper 70, a weighing mechanism frame 80, a body frame 90, a support frame 100, and a control unit 110.

The combination weighing apparatus 1 having the above configuration functions as follows. Articles as weighing objects of the combination weighing apparatus 1 are conveyed to the combination weighing apparatus 1 by a cross feeder CF. The articles are, for example, foods. The articles conveyed by the cross feeder CF are input to the article supply chute 10. The articles input to the article supply chute 10 are supplied to the dispersion table 20. The dispersion table 20 conveys the articles while dispersing the articles and supplies the articles to the plurality of radial feeders 30 arranged around the dispersion table 20. Each of the radial feeders 30 conveys the articles supplied from the dispersion table 20 to the pool hopper 40 provided corresponding to each radial feeder 30, and supplies the articles to the pool hopper 40.

Each of the pool hoppers 40 supplies the articles to the weighing hopper 50 disposed below the pool hopper 40. The control unit 110 performs a combination weighing calculation based on a measured value (a measured value of the article in the weighing hopper 50) of a load cell 56 (weighing mechanism) included in the weighing hopper 50, which will be described later. In addition, the control unit 110 selects an article combination which is closest to a target value in a predetermined allowable range of the result of the combination weighing operation. The weighing hopper 50 included in the selected combination supplies the articles to the collection discharge chute section 60. The collection discharge chute section 60 supplies the articles to the timing hopper 70. The timing hopper 70 supplies the articles to, for example, a bag making and packaging machine or the like installed in a subsequent stage of the combination weighing apparatus 1.

(2) Detailed Configuration

Subsequently, the configuration of the combination weighing apparatus 1 will be described in detail.

(2-1) Article Supply Chute

As illustrated in FIG. 1, the article supply chute 10 is disposed below the end portion of the cross feeder CF (see FIG. 2) which inputs the articles to the article supply chute 10 (the end portion on a side on which the articles are input to the article supply chute 10). In addition, the article supply chute 10 is disposed above the dispersion table 20. The article supply chute 10 is supplied with the articles conveyed by the cross feeder CF and supplies the articles to the dispersion table 20.

(2-2) Dispersion Table

The dispersion table 20 is a table-like member formed in a conical shape. The dispersion table 20 is supplied with the articles from the cross feeder CF installed above the dispersion table 20 via the article supply chute 10. The dispersion table 20 is vibrated by, for example, an electromagnet (not illustrated) so as to convey the supplied articles in a radially outward direction while dispersing the articles in a circumferential direction. The dispersion table 20 supplies the articles conveyed to the outer edge to the plurality of radial feeders 30 disposed below the outer edge side of the dispersion table 20.

(2-3) Radial Feeder

The combination weighing apparatus 1 has the plurality of (here, 14) radial feeders 30. The plurality of radial feeders 30 are annularly arranged around the dispersion table 20. The plurality of radial feeders 30 extend radially from the dispersion table 20 as the center.

Each of the radial feeders 30 is vibrated by, for example, an electromagnet (not illustrated) so as to convey the articles supplied from the dispersion table 20 in the radially outward direction (a direction away from the dispersion table 20). Each of the radial feeders 30 supplies the articles conveyed to the outer edge to the pool hopper 40 disposed below the outer edge side of each of the radial feeders 30.

(2-4) Pool Hopper

The combination weighing apparatus 1 has the same number of pool hoppers 40 as that of the radial feeders 30. As illustrated in FIG. 4, one pool hopper 40 is disposed below the outer edge side of each of the radial feeders 30. The pool hoppers 40 temporarily store the articles supplied from the radial feeders 30 disposed thereabove.

Each of the pool hoppers 40 has a PH gate 42. The PH gate 42 is provided in the lower portion the pool hopper 40. The pool hopper 40 supplies the articles in the pool hopper 40 to the weighing hopper 50 disposed below the pool hopper 40 when the PH gate 42 is opened. Each of the PH gates 42 is opened and closed as a link mechanism (not illustrated) is operated by a stepping motor 44. The operation of the stepping motor 44 is controlled by the control unit 110.

(2-5) Weighing Hopper

The combination weighing apparatus 1 has the same number of weighing hoppers 50 as that of the pool hoppers 40. One weighing hopper 50 is disposed below each of the pool hoppers 40. The weighing hopper 50 measures the weight of the article supplied from the pool hopper 40, that is, the weight of the article supplied from the radial feeder 30 via the pool hopper 40.

Each of the weighing hoppers 50 has a WH gate 52. The WH gate 52 is provided in the lower portion of the weighing hopper 50. The weighing hopper 50 supplies the articles in the weighing hopper 50 to the collection discharge chute section 60 when the WH gate 52 is opened. Each of the WH gates 52 is opened and closed as a link mechanism (not illustrated) is operated by a stepping motor 54. The operation of the stepping motor 54 is controlled by the control unit 110.

Each of the weighing hoppers 50 has a load cell 56 for weighing the article held by the weighing hopper 50. The load cell 56 is an example of the weighing mechanism. The load cell 56 transmits a weighing signal indicating the weighing result to a multiplexer 114 of the control unit 110, which will be described later, via an amplifier (not illustrated).

(2-6) Collection Discharge Chute Section

The collection discharge chute section 60 is an example of a discharge path member. The collection discharge chute section 60 has an inner chute 62 and an outer chute 64 disposed around the inner chute 62. The inner chute 62 is a chute for dust. The inner chute 62 has a conical shape. Articles (dust) and the like deviated from the main discharge path are supplied to the inner chute 62.

After combination weighing based on the weighing result of the load cell 56, the weighed articles of the selected combination are supplied from the weighing hopper 50 to the outer chute 64. The outer chute 64 collects the articles supplied from the weighing hopper 50 and supplies the articles to the timing hopper 70.

(2-7) Timing Hopper

The timing hopper 70 delivers the articles supplied from the outer chute 64 to the bag making and packaging machine or the like in the subsequent stage. A gate 72 is provided in the lower portion the timing hopper 70. The articles in the timing hopper 70 are supplied to the bag making and packaging machine or the like in the subsequent stage when the gate 72 is opened. The gate 72 is opened and closed as a link mechanism (not illustrated) is operated by a stepping motor 76. The opening and closing of the stepping motor 76 are controlled by the control unit 110. While the gate 72 is closed, the timing hopper 70 receives the weighing objects sliding down from the outer chute 64 and holds the weighing objects therein. As the gate 72 is opened, the timing hopper 70 sends the weighing objects held therein toward the lower side, and delivers the articles to the bag making and packaging machine or the like in the subsequent stage.

(2-8) Weighing Mechanism Frame

As illustrated in FIG. 4, the weighing mechanism frame 80 is a frame formed in a cylindrical shape. The weighing mechanism frame 80 mainly supports the dispersion table 20, the radial feeders 30, the pool hoppers 40, and the weighing hoppers 50. The weighing mechanism frame 80 supports the dispersion table 20 and the radial feeders 30 from below. The pool hoppers 40 and the weighing hoppers 50 are attached to the side surface of the weighing mechanism frame 80. In addition, in FIG. 4, a state in which parts of the radial feeders 30, the pool hoppers 40, and the weighing hoppers 50 are removed from the combination weighing apparatus 1 is illustrated.

Various devices are stored in the weighing mechanism frame 80. Specifically, the electromagnet (not illustrated) for vibrating the dispersion table 20, the electromagnet (not illustrated) for vibrating the radial feeders 30, the stepping motors 44 which drive the PH gates 42 of the pool hoppers 40, the stepping motors 54 which drive the WH gates 52 of the weighing hoppers 50, the load cells 56 of the weighing hoppers 50, and the like are stored in the weighing mechanism frame 80.

(2-9) Body Frame

The body frame 90 includes four support columns 92 that extend in a substantially vertical direction, three beam members (horizontal extension members) 94 disposed between the support columns 92, and four weighing machine support frames 96. The support columns 92 and the beam members 94 are connected by the beam members 94 between adjacent support columns 92 and are thus formed in an H shape in a plan view.

Figure 9:
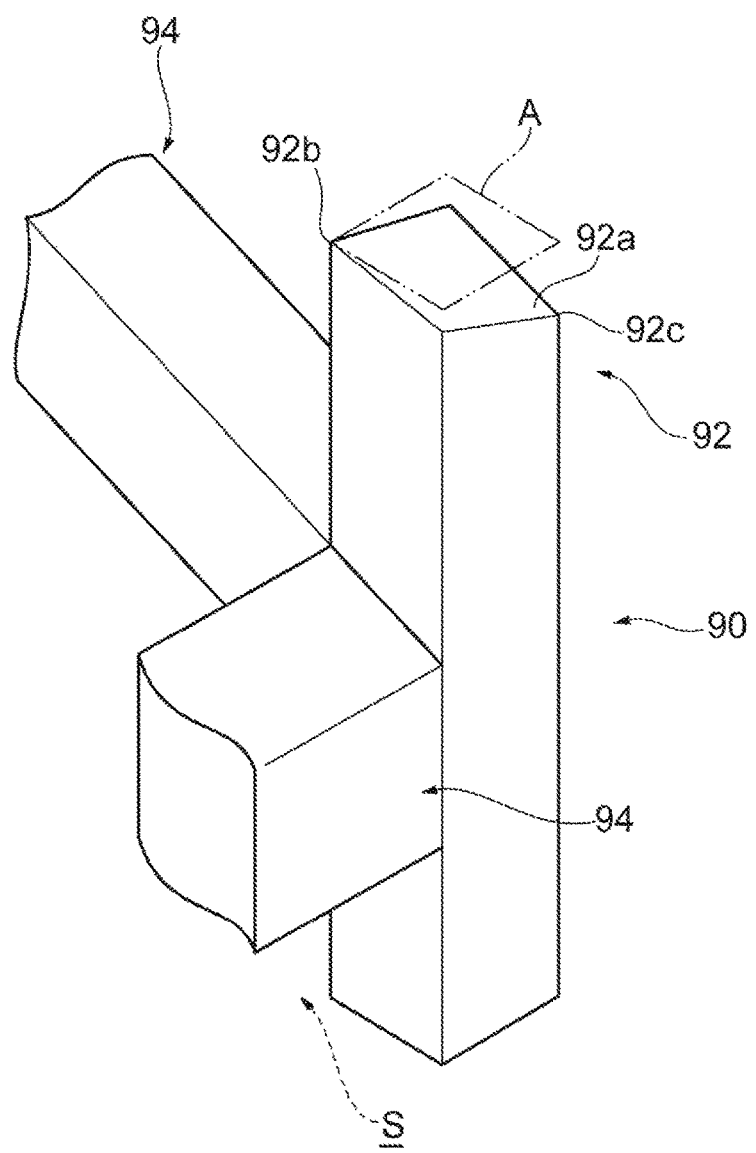
FIG. 9 is a perspective view illustrating portions of a support column and a beam member.

The support column 92 is a hollow member in which the horizontal section is formed in a square shape. The upper end of the support column 92 is blocked by an upper surface 92a (one surface). The upper surface 92a is a plate-like member on flat plates. The support column 92 has a greater dimension in the up and down direction, in other words, a substantially vertical direction, than a dimension in a horizontal direction. An upper surface 92a of the support column 92 is inclined with respect to a horizontal plane so as to prevent dust adhered thereto, cleaning water adhered during cleaning, and the like from falling to the apparatus body side (the inside of the body frame 90 (a side on which the weighing mechanism frame 80 and the collection discharge chute section 60 are disposed)). The inclination of the upper surface 92a means that a normal to the upper surface 92a is inclined with respect to the vertical direction. Specifically, the upper surface 92a of the support column 92 is inclined downward from the center of the apparatus body side toward the outside. That is, the normal to the upper surface 92a is inclined toward the outside of the apparatus body with respect to the vertical direction. As illustrated in FIG. 9, the quadrangular upper surface 92a of the support column 92, a corner 92b on the inside of the support column 92, which is closest to the apparatus body, is disposed at the highest position, and a corner 92c which is farthest from the apparatus body is disposed at the lowest position. A plane A indicated by a two-dot chain line in FIG. 9 indicates a virtual horizontal plane.

In the above description, the example in which the normal to the upper surface 92a is inclined toward the outside of the apparatus body with respect to the vertical direction has been described. However, the normal to the upper surface 92a may also be inclined toward the inside of the apparatus body with respect to the vertical direction. In short, a configuration in which dust adhered to the upper surface 92a, the cleaning water during cleaning, and the like fall to a specific place may be employed. Therefore, it is preferable that each of normals to the upper surfaces 92a is inclined toward either the outside or the inside of the apparatus body with respect to the vertical direction.

The beam member 94 is a member that extends horizontally and is constituted by flat surfaces. In this embodiment, the beam member 94 is a member that extends horizontally between the support columns 92. A space S is formed below each of the beam members 94. As the space S is formed below the beam member 94, it is easy to secure cleanliness below the combination weighing apparatus 1.

Figure 10:
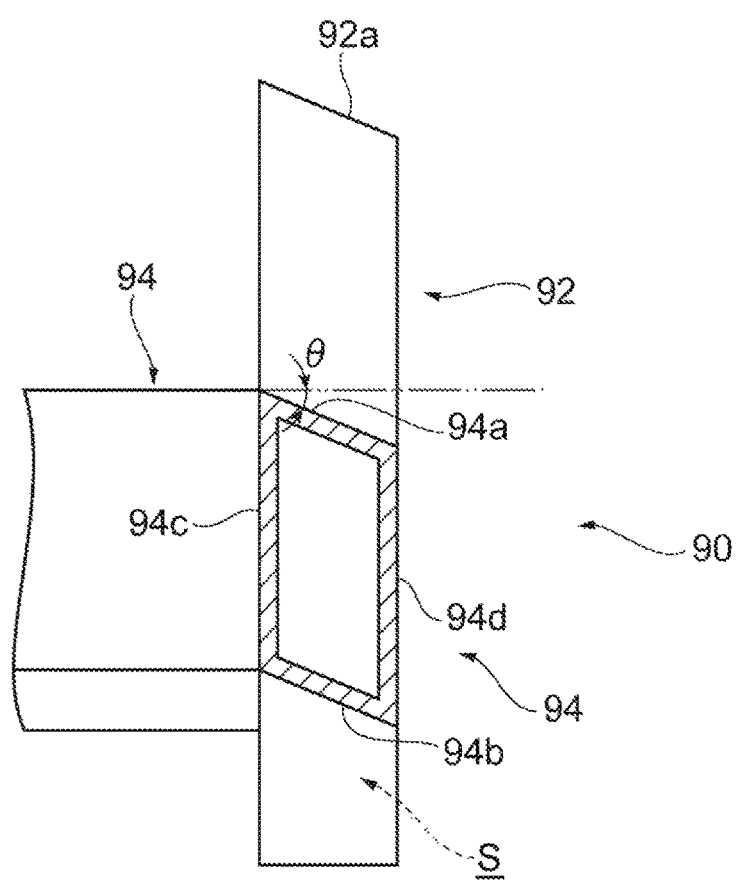
FIG. 10 is a view illustrating the sectional configuration of the beam member.

As illustrated in FIG. 10, the beam member 94 is a hollow member in which the vertical section is formed in a quadrangular shape. The vertical section of the beam member 94 has a parallelogram shape. Specifically, the vertical section of the beam member 94 has a parallelogram shape that extends longer in the up and down direction than in the horizontal direction. The upper surface 94a in the vertical section of the beam member 94 is inclined downward from the apparatus body side toward the outside. In other words, the upper surface 94a in the vertical section of the beam member 94 is inclined downward from the side on which the weighing mechanism frame 80 and the collection discharge chute section 60 are disposed toward a side on which the weighing mechanism frame 80 and the collection discharge chute section 60 are not disposed.

A lower surface 94b in the vertical section of the beam member 94 is also inclined downward from the inside toward the outside of the body frame 90. In other words, the lower surface 94b in the vertical section of the beam member 94 is inclined downward from the side on which the weighing mechanism frame 80 and the collection discharge chute section 60 are disposed toward the side on which the weighing mechanism frame 80 and the collection discharge chute section 60 are not disposed. The side surfaces (an inner side surface 94c and an outer side surface 94d) in the vertical section of the beam member 94 extend vertically (in the up and down direction).

It is preferable that the upper surface 94a and the lower surface 94b are inclined by, for example, 15 degrees or more with respect to the horizontal plane. As illustrated in FIG. 10, it is preferable that the value of an angle θ is 15 degrees or more. By setting the angle θ to be 15 degrees or more, water droplets are less likely to stay on the upper surface 94a, and water droplets can be easily guided to the outside of the combination weighing apparatus 1 (the outside of the body frame 90) along the upper surface 94a and the lower surface 94b.

An electric box 120 which stores control devices of the combination weighing apparatus 1 including the control unit 110 is attached to the support columns 92. The electric box 120 is fixed to the support columns 92. The electric box 120 and one of the support columns 92 are connected by a pipe 121 (see FIG. 4). The pipe 121 is a hollow member, and causes the inner space of the hollow support column 92 to communicate with the inside of the electric box 120. Inside of the pipe 121, wires for electrically connecting devices and the like stored in the weighing mechanism frame 80 to devices and the like in the electric box 120 are passed.

An upper surface 120a of the electric box 120 is inclined downward from the apparatus body side toward the outside away from the body frame 90. It is preferable that the upper surface 120a is inclined by 15 degrees or more with respect to the horizontal plane.

In addition, the support column 92 is provided with a camera device 130. The camera device 99 images, for example, the dispersed state of the articles in the dispersion table 20. The camera device 130 has an attachment portion 131 attached to the support column 92, an extension and contraction portion 132 extending along the up and down direction, and a camera portion 133.

The attachment portion 131 is a hollow member having a circular section. The attachment portion 131 has a substantially L shape. The attachment portion 131 is fixed to a side surface 92d of the support column 92. In a state of being fixed to the side surface 92d of the support column 92, a part of the attachment portion 131 extends outward from the side surface 92d, and a part of the attachment portion 131 extends in the up and down direction via a bent portion bent at approximately 90 degrees. The extension and contraction portion 132 is a hollow member having a circular section, and can be extended or contracted. The tip end portion of the extension and contraction portion 132 is bent at approximately 90 degrees. The extension and contraction portion 132 has a lower end portion side inserted into the attachment portion 131 and is extension and contraction with respect to the attachment portion as a first adjustment portion 134 provided at the tip end portion of the attachment portion 131 is operated. By being rotated in one direction, the first adjustment portion 134 releases the extension and contraction portion 132 fixed to the attachment portion 131 to enable the extension and contraction portion 132 to be extended, contracted, or rotated. In addition, by being rotated in the other direction, the first adjustment portion 134 fixes the extension and contraction portion 132 to the attachment portion 131 to restrict extension, contraction, and rotation of the extension and contraction portion 132.

One end portion side of the camera portion 133 is inserted into the tip end portion of the extension and contraction portion 132. The camera portion 133 is rotatable relative to the extension and contraction portion 132 as a second adjustment portion 135 provided at the tip end of the extension and contraction portion 132 is operated. By being rotated in one direction, the second adjustment portion 135 releases the camera portion 133 fixed to the extension and contraction portion 132 to enable the camera portion 133 to be rotated. In addition, by being rotated in the other direction, the second adjustment portion 135 fixes the camera portion 133 to the extension and contraction portion 132 to restrict rotation of the camera portion 133. Wires connected to the camera are passed through the inside of the extension and contraction portion 132 and the attachment portion 131.

Figure 11:
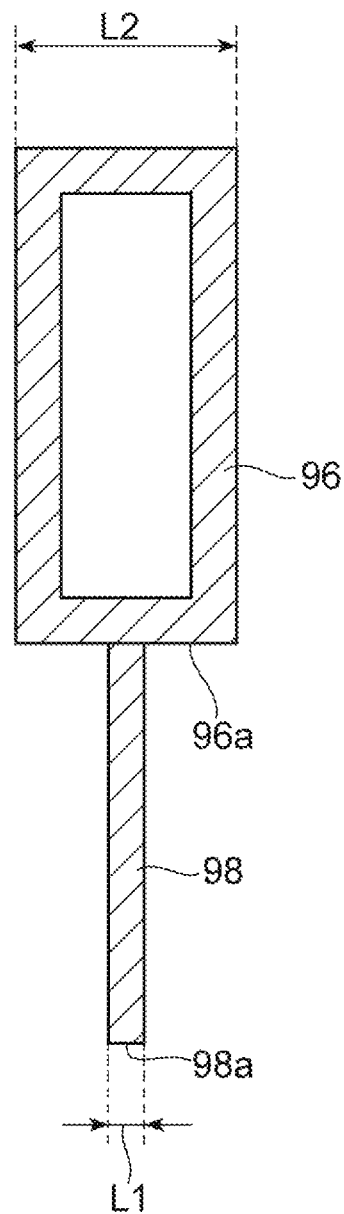
FIG. 11 is a view illustrating the section of a support frame.

The weighing machine support frames 96 are members that are disposed between the weighing mechanism frame 80 and the support columns 92 and connect the weighing mechanism frame 80 to the support columns 92. As illustrated in FIG. 11, the weighing machine support frame 96 is a hollow member constituted by flat surfaces. The weighing machine support frame 96 has a greater dimension in the up and down direction than a dimension in the horizontal direction. The weighing machine support frames 96 are provided respectively for the support columns 92. Each of the weighing machine support frames 96 extends obliquely upward from the corresponding support column 92 toward the weighing mechanism frame 80. The weighing machine support frame 96 connects the lower portion of the weighing mechanism frame 80 to the upper portion of the support column 92 of the body frame 90, which will be described later.

As illustrated in FIG. 8, an angle θ between a lower surface 80b of the weighing mechanism frame 80 and a lower surface 96a of the weighing machine support frame 96 at the joint portion between the weighing mechanism frame 80 and the weighing machine support frame 96 is an obtuse angle.

The weighing machine support frames 96 are supported by the support columns 92. The weighing machine support frames 96 support the weighing mechanism frame 80. That is, the support columns 92 support the weighing mechanism frame 80 via the weighing machine support frames 96.

The body frame 90 is disposed on a stand (not illustrated). Below the stand, apparatuses (not illustrated) such as the bag making and packaging machine are disposed, and the articles are supplied from the timing hopper 70 to the apparatuses.

As shown in FIG. 8, the weighing machine support frames 96 are provided with ribs 98. The rib 98 extends to the lower surface 96a (lower portion) of the weighing machine support frame 96 along an extension direction of the weighing machine support frame 96. The rib 98 is a plate-like member. As illustrated in FIG. 11, a width dimension L1 in the horizontal direction of the rib 98 is smaller than a width dimension L2 of the weighing machine support frame 96. The inclination angle of a lower surface 98a of the rib 98 with respect to the horizontal direction is greater than the inclination angle of the lower surface 96a of the weighing machine support frame 96. Accordingly, the dimension of the rib 98 in the vertical direction increases toward the lower end portion side thereof. One end portion of the rib 98 is joined to the support column 92.

The rib 98 is provided with a through-hole 98h. The through-hole 98h is disposed at the joint portion to the weighing machine support frame 96 on the support column 92 side. A belt (not illustrated) is passed through the through-hole 98h, for example, when the body frame 90 is installed. This makes it possible to lift the body frame 90.

(2-10) Support Frame

The support frame 100 supports a component group that is provided so as to be detachable from the combination weighing apparatus 1. The support frame 100 includes a first support frame 200, a second support frame 220, and a third support frame 240.

Figure 12:
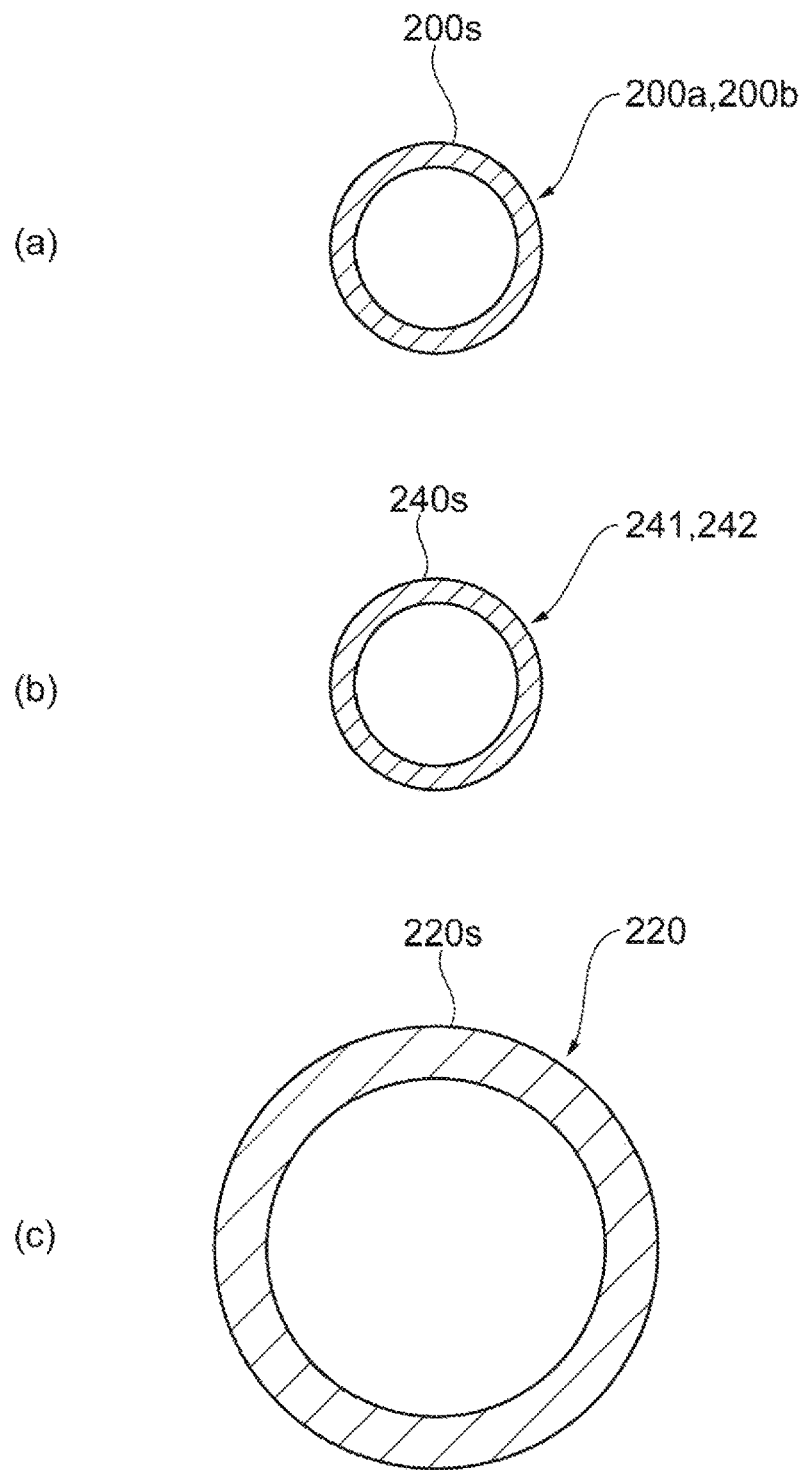
FIG. 12 is a view illustrating the sections of a weighing machine support frame and a rib.

The first support frame 200 supports the article supply chute 10. The first support frame 200 includes a first frame 200a and a second frame 200b. The section of each of the first frame 200a and the second frame 200b has a true circle shape as illustrated in FIG. 12(a). That is, in each of the first frame 200a and the second frame 200b, an entire surface 200s including the upper surface is curved. The first frame 200a is fixed to the weighing mechanism frame 80 and supports the second frame 200b. The first frame 200a and the second frame 200b are connected to each other by a connection member 202. No screw is used for the connection member 202. The second frame 200b supports the article supply chute 10 above the dispersion table 20. The second frame 200b supports the article supply chute 10 via an attachment member 204. No screw is used for the attachment member 204. The article supply chute 10 is provided so as to be detachable from the second frame 200b.

The second support frame 220 supports the outer chute 64 of the collection discharge chute section 60. The second support frame 220 has an annular shape. In this embodiment, as illustrated in FIG. 12(c), the section of the second support frame 220 has a true circle shape. That is, in the second support frame 220, an entire surface 220s including the upper surface is curved. The second support frame 220 supports the outer chute 64 by a hook 222. The hook 222 is provided at the upper portion of the outer circumferential surface of the outer chute 64. The hook 222 is engaged with the second support frame 220. The outer chute 64 is provided so as to be detachable from the second support frame 220 by the hook 222. The second support frame 220 may be integrally formed, or may be formed by a combination of a plurality of members.

The second support frame 220 is supported by the weighing machine support frames 96 of the body frame 90. Specifically, a through-hole 96h is formed in the vicinity of the lower end portion of the weighing machine support frame 96 joined to the support column 92 as illustrated in FIG. 8. The second support frame 220 is inserted through the through-holes 96h and is thus supported by the weighing machine support frames 96.

The third support frame 240 supports the timing hopper 70. The third support frame 240 includes a pair of first frames 241 which extend parallel to each other with the timing hopper 70 interposed therebetween, and a pair of second frames 242 which extend in a direction orthogonal to the first frames with the timing hopper 70 interposed therebetween and connect the pair of first frames 241 to each other. The section of each of the first frame 241 and the second frame 242 has a true circle shape as illustrated in FIG. 12(b). That is, in each of the first frame 241 and the second frame 242, an entire surface 240s including the upper surface is curved.

The first frame 241 is fixed to the beam member 94 by a fixing frame 243. The fixing frame 243 is a hollow member which is constituted by flat surfaces and extends in the up and down direction. The end portion of the first frame 241 is connected to the lower end portion of the fixing frame 243. The fixing frame 243 is fixed to the inner side surface 94c of the beam member 94 by a fixing member 244.

The second frames 242 support the timing hopper 70. One second frame 242 is provided with a stopper 245 as illustrated in FIG. 7. The stopper 245 restricts movement of a bar-like member 71 extending parallel to the second frame 242 in the timing hopper 70. Specifically, the stopper 245 has a movable portion 245a. The movable portion 245a is positioned above the bar-like member 71 (abuts on the upper portion of the bar-like member 71) and restricts movement of the bar-like member 71 in the up and down direction. The stopper 245 prevents the timing hopper 70 from floating up by an impact applied to the timing hopper 70 and deviating from the second frame 242.

(2-11) Control Unit

The control unit 110 includes a CPU (Central Processing Unit) 112 and a memory 113 such as a ROM (Read Only Memory) and a RAM (Random Access Memory) (see FIG. 3). Furthermore, the control unit 110 includes the multiplexer 114, an A/D converter 115, and a DSP (digital signal processor) 116.

According to a command of the DSP 116, the multiplexer 114 selects one weighing signal from among the weighing signals of the load cells 56 and transmits the selected weighing signal to the A/D converter 115. The A/D converter 115 converts the weighing signal (analog signal) received from the multiplexer 114 into a digital signal according to a timing signal transmitted from the DSP 116, and transmits the digital signal to the DSP 116. The DSP 116 performs filter processing on the digital signal transmitted from the A/D converter 115.

The control unit 110 is connected to each unit of the combination weighing apparatus 1 such as the dispersion table 20, the radial feeders 30, the stepping motor 44, the stepping motor 54, the stepping motor 76, and a touch panel 117. In the control unit 110, the CPU 112 controls each unit of the combination weighing apparatus 1 by executing programs stored in the memory 113.

(Operational Effects)

As described above, in the combination weighing apparatus 1 according to this embodiment, the upper surface and/or the lower surface of the body frame 90 (the support columns 92 and the beam members 94) is inclined downward from the apparatus side toward the outside. Accordingly, the cleaning water or the like adhered to the upper surface or/and the lower surface easily falls to the outside of the apparatus. Therefore, it is possible to prevent the cleaning water or the like from falling to the inside of the apparatus or immediately therebelow, and a further improvement in sanitation can be achieved.

In this embodiment, the support columns 92, the beam members 94, and the weighing machine support frames 96 of the body frame 90 are constituted by flat surfaces. Accordingly, the body frame 90 can have higher rigidity than a cylindrical frame having the same external dimensions. Therefore, disturbance such as floor vibration and vibration due to the apparatus itself can be effectively suppressed. As a result, the influence of disturbance and the like on the load cell 56 can be suppressed, and an improvement in the weighing accuracy of the load cell 56 can be achieved.

In this embodiment, the entire surface of the support frame 100 which supports the detachably provided component group is curved. Therefore, when components are attached to or detached from the support frame 100, even in a case where an operator grasps the support frame 100 or contacts the support frame 100, safety can be secured.

In this embodiment, the section of the support frame 100 has a true circle shape. Accordingly, safety can be further enhanced and manufacturing can be easily performed.

In this embodiment, the dimensions in the up and down direction of the support columns 92, the beam members 94, and the weighing machine support frames 96, which are included in the body frame 90, are larger than the dimensions thereof in the horizontal direction. When the dimensions in the up and down direction are larger than the dimensions in the horizontal direction, the rigidity in the up and down direction of the support columns 92, the beam members 94, and the weighing machine support frames 96 can be further enhanced. As a result, vibration can be more effectively suppressed.

In this embodiment, the plate-like rib 98 which extends to the lower portion of the weighing machine support frame 96 and has smaller a dimension in the horizontal direction than the weighing machine support frame 96. The inclination angle of the lower surface 98a of the rib 98 is greater than the inclination angle of the lower surface 96a of the weighing machine support frame 96. By providing the ribs 98, the rigidity of the weighing machine support frame 96 can be further enhanced. As a result, disturbance such as floor vibration and vibration due to the apparatus itself can be further suppressed, and it becomes possible to further enhance the weighing accuracy. In addition, the rib 98 has a plate shape having a smaller dimension in the horizontal direction than that of the weighing machine support frame 96, and the inclination angle of the lower surface 98a of the rib 98 is set to be greater than the inclination angle of the lower surface 96a of the weighing machine support frame 96. Accordingly, the cleaning water or the like is easily concentrated on the lower surface 98a of the rib 98, and the cleaning water or the like flows along the lower surface 98a of the rib 98 and is discharged. Therefore, the accumulation of the cleaning water or the like on the lower surface 98a of the rib 98 can be prevented, and as a result, sanitation is further improved.

In this embodiment, the beam member 94 is disposed between the two support columns 92. The space S is formed below the beam member 94. Since the space S is formed below the beam member 94, cleaning can be easy performed. In addition, even in a case where a portion of the cleaning water or the like flowing along the surface of the beam member 94 and falling to the outside of the combination weighing apparatus 1 is accumulated below the combination weighing apparatus 1, this can be easily found and removed.

In this embodiment, the third support frame 240 which supports the timing hopper 70 is fixed to the inner side surface 94c of the beam member 94. Accordingly, compared with a case where the third support frame 240 is fixed to the lower surface 94b of the beam member 94, the number of fixed portions can be increased. As a result, transmission of vibration due to the opening and closing of the gate 72 of the timing hopper 70 to the load cell 56 can be suppressed. As a result, an improvement in the weighing accuracy can be achieved.

In this embodiment, the link mechanism 74 provided in the timing hopper 70 employs a configuration in which screws are not exposed. In a configuration in which screws are exposed, articles and the like are likely to adhere to the threads and cannot be easily cleaned. Therefore, by employing the configuration in which screws are not exposed in the link mechanism 74, an improvement in sanitation can be achieved.

In this embodiment, the camera device 130 is attached to the side surface 92d on the outside of the support column 92. Accordingly, it is possible to prevent water droplets or the like adhered to the camera device 130 from falling to the inside of the apparatus or immediately therebelow, and excellent sanitation is achieved. In the related art, a camera device is attached by a bracket of which the position can be adjusted. The bracket is fixed to the support column 92 by bolts. In a case of using bolts, there is concern that articles and the like may be caught between the bolts when the bolts are tightened, and in this case, there is concern that sanitation may be degraded. In this embodiment, the configuration in which the height position of the camera portion 133 is adjusted by extending or contracting the extension and contraction portion 132 through a rotating operation of the first adjustment portion 134 is employed, and no bolts are used. Therefore, an improvement in sanitation can be achieved.

The present invention is not limited to the above-described embodiment. For example, in the above-described embodiment, food has been described as an example the article, but the article may be another thing.

In the above-described embodiment, the form in which the dispersion table 20 disperses the articles using vibration has been described as an example, but the articles may be dispersed by rotating the dispersion table 20. In addition, the form in which the radial feeder 30 conveys the articles using vibration has been described as an example, but the radial feeder 30 may convey the articles for example, using a coil unit (screw) that can be rotated.

In the above-described embodiment, the form in which the sections of the first support frame 200, the second support frame 220, and the third support frame 240 have a true circle shape has been described as an example, but the sections may also have an elliptical shape or the like. The point is that at least the upper surface is curved. However, from the viewpoint of reducing the material costs and the like, it is preferable that the section of each frame has a true circle shape.

In the above-described embodiment, the configuration in which the collection discharge chute section 60 has the inner chute 62 and the outer chute 64 has been described as an example, but the collection discharge chute section 60 is not limited to the configuration constituted by the inner chute 62 and the outer chute 64. For example, the collection discharge chute section 60 may be constituted by a single chute.

In the above-described embodiment, the vertical section of the beam member 94 extends longer in the up and down direction than in the width direction. However, the beam member 94 is not limited thereto, and may be elongated in the width direction. Here, in order to keep the accuracy of the combination weighing apparatus 1 high, it is preferable to secure the rigidity of the beam member 94 in the up and down direction. In this case, it is preferable that the vertical section of the beam member 94 extends long in the up and down direction.

In the above-described embodiment, the configuration in which the support column 92 and the beam member 94 are hollow members has been described as an example, but the support column 92 and the beam member 94 are not limited thereto and may also be solid members. However, from the viewpoint of reducing the weight of the combination weighing apparatus 1 or reducing the material costs and the like, it is preferable that the support column 92 and the beam member 94 are hollow members.

In the above-described embodiment, the lower surface 94b in the vertical section of the beam member 94 is also inclined downward from the inside toward the outside of the body frame 90, but the lower surface 94b is not limited thereto. The lower surface 94b in the vertical section of the beam member 94 may be not inclined (may be horizontal).

However, in order to guide water droplets and the like adhered to the combination weighing apparatus 1 to the outside of the combination weighing apparatus 1, it is preferable that the lower surface 94*b* in the vertical section of the beam member 94 is also inclined downward from the inside toward the outside of the body frame 90.

In the above-described embodiment, the form in which the vertical section of the beam member 94 has a quadrangular shape (parallelogram shape) has been described as an example. However, the shape of the vertical section of the beam member 94 is not limited thereto.

Figure 13:
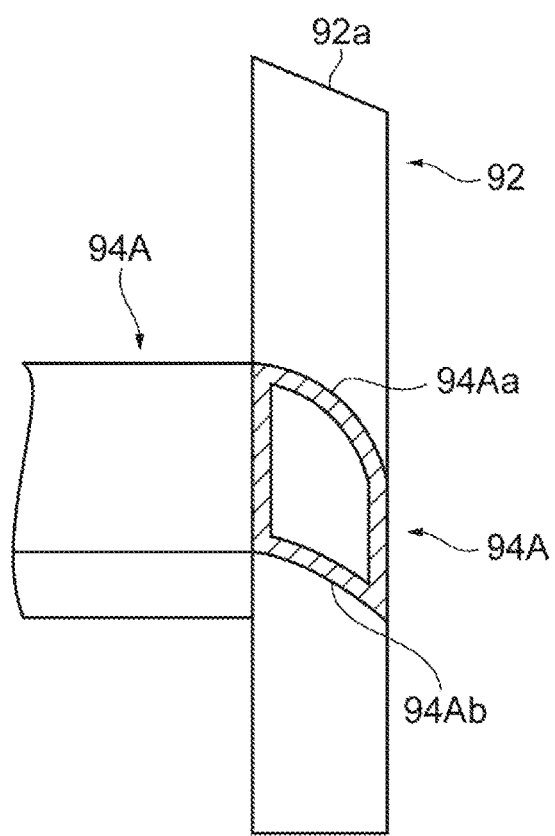
FIG. 13 is a view illustrating the sectional configuration of a beam member a combination weighing apparatus according to another embodiment.

For example, as illustrated in FIG. 13, an upper surface 94Aa and a lower surface 94Ab of a beam member 94A may be curved surfaces that are inclined downward from the inside toward the outside of the body frame 90.

Figure 14:
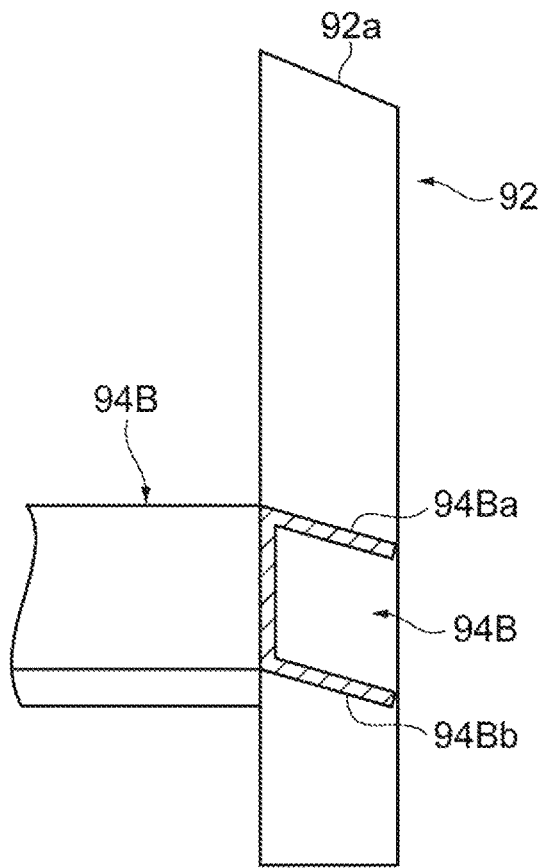
FIG. 14 is a view illustrating the sectional configuration of a beam member a combination weighing apparatus according to another embodiment.

For example, as illustrated in FIG. 14, a beam member 94B may have a groove shape in which an upper surface 94Ba and a lower surface 94Bb are inclined downward from the inside toward the outside of the body frame 90, and the outer side portion thereof is open.

Figure 15:
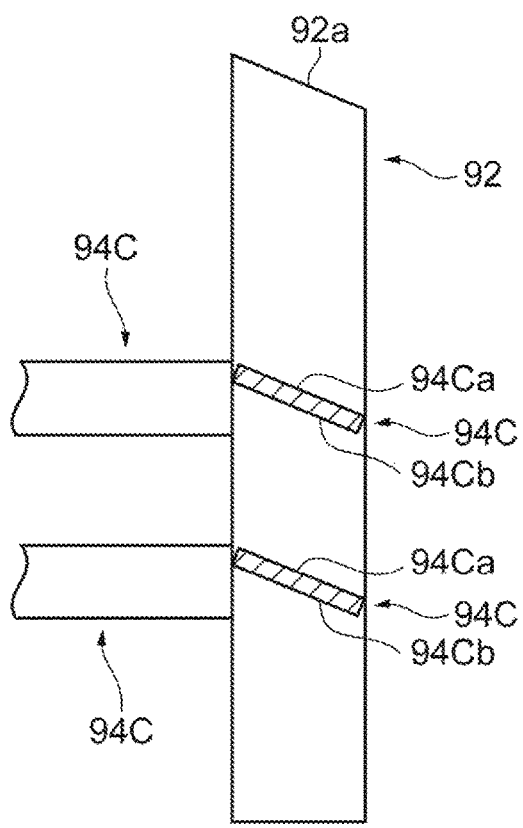
FIG. 15 is a view illustrating the sectional configuration of a beam member a combination weighing apparatus according to another embodiment.

For example, as illustrated in FIG. 15, a beam member 94C may have a plate-like member in which an upper surface 94Ca and a lower surface 94Cb are inclined downward from the inside toward the outside of the body frame 90. From the viewpoint of the rigidity of the body frame 90, it is preferable that a portion extending in the up and down direction is also included. In the example illustrated in FIG. 15, two beam members 94C are disposed in parallel to each other in the up and down direction, but the number of beam members 94C is not limited thereto. The number of beam member 94C may be 1 or 3 or more.

In the above-described embodiment, the form in which the upper surface 94*a* and the lower surface 94*b* of the beam member 94, which are flat, are inclined downward from the inside toward the outside of the body frame 90 has been described as an example. However, for example, a case where the upper surface and/or the lower surface in the vertical section of the beam member are inclined downward from the inside toward the outside of the body frame 90 includes a configuration in which the main upper surface and/or the main lower surface of the beam member are inclined downward from the inside toward the outside of the body frame 90. In addition, the main upper surface of the vertical section of the beam member means, when the upper surface of the beam member is projected onto a straight line extending in a left and right direction (a direction orthogonal to the up and down direction), a surface of which the length occupies ⅔ or more of the total projected length. The main lower surface of the vertical section of the beam member is also defined in the same manner.

Figure 16:
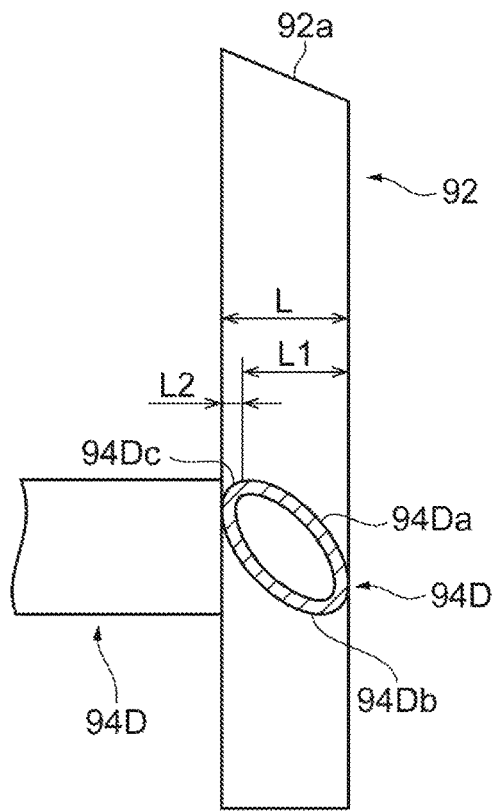
FIG. 16 is a view illustrating the sectional configuration of a beam member a combination weighing apparatus according to another embodiment.

Specifically, for example, as illustrated in FIG. 16, in a beam member 94D, an upper surface 94Da as the main upper surface and a lower surface 94Db as the main lower surface are inclined downward from the inside toward the outside of the body frame 90. The vertical section of the beam member 94D may have an elliptical shape.

More specifically, the upper surface of the vertical section of the beam member 94D illustrated in FIG. 16 includes an upper surface 94Da inclined downward from the inside toward the outside of the body frame 90 and an upper surface 94Dc inclined downward from the outside of the body frame 90 toward the inside. When the upper surface (the entire upper surface constituted by the upper surface 94Da and the upper surface 94Dc) of the vertical section of the beam member 94D is projected onto a straight line extending in the left and right direction, the total projected length is denoted by L in FIG. 16. Furthermore, the length of the upper surface 94Da projected onto the straight line extending in the left and right direction is denoted by L1, and the length of the upper surface 94Dc projected onto the straight line extending in the left and right direction is denoted by L2. Here, since the value obtained by dividing L1 by L (the value of L1/L) exceeds ⅔, the upper surface 94Da is the main upper surface. Here, since the upper surface 94Da is inclined downward from the inside toward the outside of the body frame 90, the cleaning water or the like adhered to the beam member 94D easily falls to the outside of the combination weighing apparatus 11.

Figure 17:
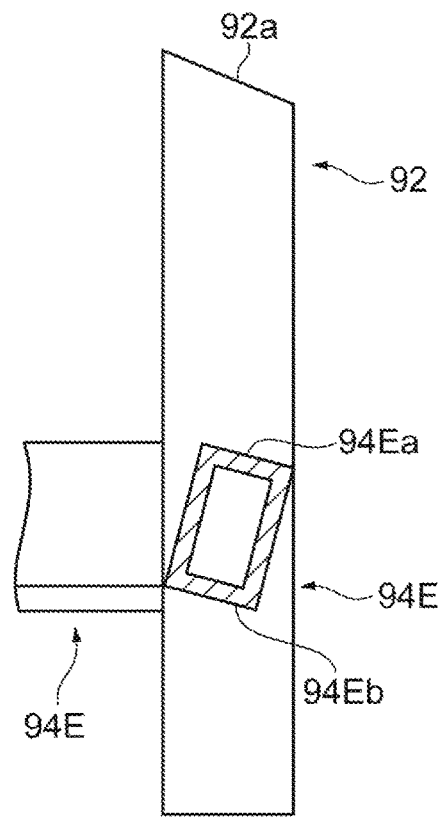
FIG. 17 is a view illustrating the sectional configuration of a beam member a combination weighing apparatus according to another embodiment.

Furthermore, for example, as illustrated in FIG. 17, in a beam member 94E, an upper surface 94Ea as the main upper surface and a lower surface 94Eb as the main lower surface are inclined downward from the inside toward the outside of the body frame 90. Here, since the upper surface 94Ea and the lower surface 94Eb are inclined downward from the inside toward the outside of the body frame 90, the cleaning water or the like adhered to the beam member 94E easily falls to the outside of the combination weighing apparatus 11.

In the above-described embodiment, the beam member 94 is disposed to extend horizontally between the support columns 92, but the beam member 94 is not limited thereto. For example, the beam members 94 may be disposed to extend obliquely between the support columns 92 like diagonal supports.

In the above-described embodiment, the beam member 94 is disposed between the support columns 92, but the beam member 94 is not limited thereto. Even regarding a beam member that extends in the horizontal direction used for parts other than between the support columns 92, by causing the vertical section thereof to have the upper surface and/or the lower surface inclined downward from the inside toward the outside of the body frame 90, the same effect as in the above-described embodiment can be obtained.

In the above-described embodiment, the electric box 120 is fixed to the body frame 90, but the electric box 120 is not limited thereto. The electric box 120 may be separately provided without being fixed to the body frame 90, and wires that connect the devices and the like in the electric box 120 to the devices and the like stored in the weighing mechanism frame 80 may be configured to be laid to the electric box 120 through the inside of a flexible tube or the like.

In the above-described embodiment, the form in which the lower surface (not illustrated) in the vertical section of the electric box 120 is not inclined has been described as an example, but the lower surface is not limited thereto. From the viewpoint of sanitation, it is preferable that the lower surface in the vertical section of the electric box 120 is also inclined downward from the body frame 90 side toward the side away from the body frame 90. In this case, it is preferable that the lower surface in the vertical section of the electric box 120 is inclined by 15 degrees or more with respect to the horizontal plane.

In the above-described embodiment, as illustrated in FIG. 4, the support columns 92 are connected by the beam member 94 such that the support columns 92 and the beam members 94 of the body frame 90 are formed in an H shape in the plan view, but the body frame 90 is not limited thereto. For example, a configuration in which two beam members 94 are disposed at positions to extend parallel to each other between the support columns 92 may be employed. Furthermore, for example, a configuration in which four beam members 94 connect the respective support columns 92 may be employed. However, from the viewpoint of maintainability of the apparatuses installed below the combination weighing apparatus 1, it is preferable that the beam member 94 is not provided between any of the adjacent support columns 92 to secure maintenance space.

In the above-described embodiment, a rubber member such as an elastomer may be interposed at the joint portion between metal members. Breeding of bacteria and the like may occur at the joint portion between metal members. By interposing the rubber member between the metal members, the metal members do not come into contact with each other, and thus breeding of bacteria and the like can be suppressed.

REFERENCE SIGNS LIST

1 . . . combination weighing apparatus, 56 . . . load cell (weighing mechanism), 60 . . . collection discharge chute section (discharge path member), 80 . . . weighing mechanism frame, 90 . . . body frame, 92 . . . support column, 92*a* . . . upper surface, 94 . . . beam member (horizontal extension member), 92*a* . . . upper surface, 94*b* . . . lower surface, 96 . . . weighing machine support frame, 96*a* . . . lower surface, 98 . . . rib, 98*a* . . . lower surface, 100 . . . support frame

The invention claimed is:

1. A combination weighing apparatus comprising: a plurality of weighing mechanisms; a weighing mechanism frame which stores the weighing mechanisms; and a body frame which indirectly supports the weighing mechanism frame, wherein the body frame includes: support columns disposed in a vertical direction, horizontal extension members disposed between the support columns, and a weighing machine support frame disposed between the weighing mechanism frame and the support columns and providing a contact surface that braces and directly supports the weighing mechanism frame, and a normal to a surface of any one of the support columns and the horizontal extension members in the body frame is inclined with respect to the vertical direction.

2. The combination weighing apparatus according to claim 1,
wherein the body frame is constituted by flat surfaces, and
a normal to an upper surface and/or a lower surface of the body frame is inclined with respect to the vertical direction.

3. The combination weighing apparatus according to claim 2,
wherein the normal to the upper surface and/or the lower surface of the body frame is inclined toward an outside or an inside of the body frame with respect to the vertical direction.

4. The combination weighing apparatus according to claim 1,
wherein the horizontal extension members extend horizontally, and
a normal to an upper surface and/or a lower surface in a vertical section of the horizontal extension members are inclined with respect to the vertical direction.

5. The combination weighing apparatus according to claim 4,
wherein the normal to the upper surface and/or the lower surface of the horizontal extension members are inclined toward the outside or the inside of the body frame with respect to the vertical direction.

6. The combination weighing apparatus to claim 4,
wherein the vertical section of the horizontal extension members have a quadrangular shape that is elongated in the vertical direction.

7. The combination weighing apparatus according to claim 6,
wherein
at a joint portion between the weighing mechanism frame and the weighing machine support frame, an angle between a lower surface of the weighing mechanism frame and a lower surface of the weighing machine support frame is an obtuse angle.

8. The combination weighing apparatus according to claim 7, further comprising:
a plate-like rib which extends to a lower portion of the weighing machine support frame and has a smaller dimension in the horizontal direction than that of the weighing machine support frame, and
an inclination angle of a lower surface of the rib is greater than an inclination angle of the lower surface of the weighing machine support frame.

9. The combination weighing apparatus according to claim 7, further comprising:
a discharge path member which discharges articles weighed by the weighing mechanisms after combination weighing to a lower side,
wherein a normal to an upper surface of the support columns are inclined toward an outside of the discharge path member with respect to the vertical direction.

10. The combination weighing apparatus according to claim 1, further comprising:
a support frame which supports a component group that is provided so as to be detachable from the apparatus,
wherein the support frame is disposed substantially horizontally and an upper surface thereof is curved.

11. The combination weighing apparatus according to claim 10,
wherein an entire surface of the support frame is curved.

12. The combination weighing apparatus according to claim 11,
wherein a section of the support frame has a true circle shape.

13. The combination weighing apparatus according to claim 1,
further comprising a support frame that directly supports the weighing mechanism frame, and is interposed between the body frame and the weighing mechanism frame.

14. The combination weighing apparatus according to claim 13, wherein the body frame directly supports the support frame.

* * * * *